UNITED STATES PATENT OFFICE.

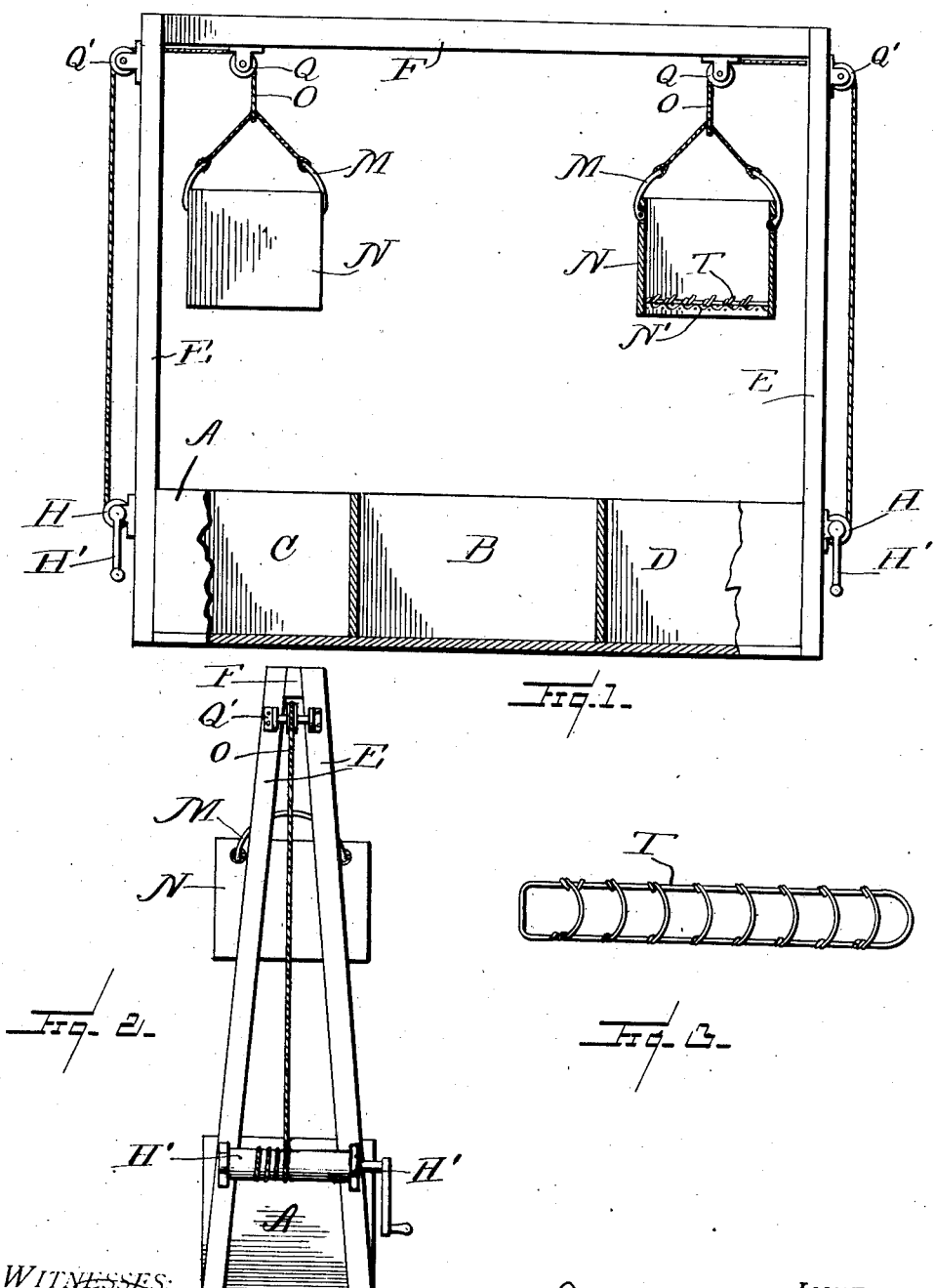

DAVID H. SIMMONS, OF FUNK, NEBRASKA.

DISH-WASHER.

No. 832,818.  Specification of Letters Patent.  Patented Oct. 9, 1906.

Application filed June 14, 1904. Serial No. 212,556.

*To all whom it may concern:*

Be it known that I, DAVID H. SIMMONS, a citizen of the United States, residing at Funk, in the county of Phelps and State of Nebraska, have invented certain new and useful Improvements in Dish-Washers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in dish washing and rinsing apparatus; and the object of the invention is to produce a simple and efficient means whereby a quantity of dishes may be quickly and thoroughly cleansed.

The invention comprises various details of construction and combinations and arrangements of parts, which will be hereinafter fully described and then specifically defined in the appended claim.

I illustrate my invention in the accompanying drawings, which, with the letters of reference marked thereon, form a part of this application, and in which—

Figure 1 is a vertical sectional view through my improved dish-washing apparatus. Fig. 2 is an end elevation, and Fig. 3 is a detail view, of one of the racks positioned within the tanks for holding the dishes in place.

Reference now being had to the details of the drawings by letter, A designates a tank having a plurality of compartments, three being shown in the drawings, the central one (designated by letter B) comprising a rinsing-tank and the end compartments C and D being for the purpose of washing dishes. Rising from the ends of the compartment-tank are the standards E, and F is a cross-piece connecting the upper ends of said standards.

N designates a receptacle having a perforated bottom N', in which dishes may be set on edge or otherwise, and a handle M is fastened to each of said receptacles, and a rope O is secured to said handle and passes over a pulley Q, supported by the cross-piece F, and thence passes over a pulley Q', mounted upon one of said standards, and thence extends down and about a winding-drum H, journaled in suitable bearings in the standards at one end of said compartment-tank. A crank H' is fitted to said winding-drum, whereby the drum may be turned in one direction for the purpose of raising the receptacle from one of the compartments of the tank. Each compartment is provided with a similar receptacle and hoisting-rope, there being two drums, one at each end of the tank, in which the ropes may be wound.

In the bottom of each receptacle is an elongated rack T, which is adapted to rest a short distance above the bottom of the receptacle and has a series of wires twisted about the opposite longitudinal wires of the rack and disposed in parallel inclined planes and between which dishes are adapted to be frictionally held for the purpose of allowing water to freely circulate about the dishes to insure their being thoroughly rinsed.

The operation of my dish-washing apparatus is as follows: The dishes to be washed are placed in one of the receptacles adapted to be lowered into one of the end compartments of the tank, and by raising and lowering the receptacle by means of the windlass and rope connections therewith the water is agitated and coming against the dishes will thoroughly cleanse the same, after which the receptacle, with the dishes therein, may be lowered into the central tank, where they may be thoroughly rinsed.

By the provision of my improved dish-washing apparatus it will be observed that a simple and efficient means is provided for quickly cleansing the dishes in large quantities, thus affording a mechanism especially adapted for hotel use or where it is desired to wash large quantities of dishes quickly.

Having thus fully described my invention, what I claim as new, and desire to secure by Letters Patent, is—

In combination with a receptacle, a metallic rack mounted within the receptacle a slight distance above the bottom thereof and comprising longitudinal wires at its opposite edges and with cross-pieces of wire which are coiled about the said longitudinal wires of the rack and disposed in parallel inclined planes, as set forth.

In testimony whereof I hereunto affix my signature in presence of two witnesses.

DAVID H. SIMMONS.

Witnesses:
L. C. HUCK,
JOHN N. GUSKIN.